United States Patent
Daandels et al.

(10) Patent No.: US 12,371,148 B2
(45) Date of Patent: Jul. 29, 2025

(54) AERODYNAMIC SYSTEM FOR AN AIRCRAFT

(71) Applicant: Airbus Operations GmbH, Hamburg (DE)

(72) Inventors: Dort Daandels, Hamburg (DE); Florian Lorenz, Hamburg (DE); Sönke Wunderlich, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 18/630,256

(22) Filed: Apr. 9, 2024

(65) Prior Publication Data
US 2024/0343382 A1    Oct. 17, 2024

(30) Foreign Application Priority Data
Apr. 11, 2023 (EP) .................................. 23167356

(51) Int. Cl.
*B64C 9/04* (2006.01)
*B64C 9/02* (2006.01)
(Continued)

(52) U.S. Cl.
CPC .................. *B64C 9/04* (2013.01); *B64C 9/02* (2013.01); *B64C 9/10* (2013.01); *B64C 9/16* (2013.01)

(58) Field of Classification Search
CPC .... B64C 7/00; B64C 9/02; B64C 9/10; B64C 2009/143
See application file for complete search history.

(56) References Cited

U.S. PATENT DOCUMENTS 2,444,293 A    6/1948   Holt
2,666,603 A *  1/1954   Horkey ..................... B64C 9/02
                                                         244/90 B
(Continued)

FOREIGN PATENT DOCUMENTS

EP    1194330 B2    7/2012
EP    3822162 B1    3/2023
(Continued)

OTHER PUBLICATIONS

European Search Report for corresponding European U.S. Appl. No. 23/167,356 dated Sep. 13, 2023.

*Primary Examiner* — Joshua J Michener
*Assistant Examiner* — Michael B. Kreiner
(74) *Attorney, Agent, or Firm* — Greer, Burns & Crain, Ltd.

(57) ABSTRACT

An aerodynamic system for an aircraft. The aerodynamic system includes a first aerodynamic component configured to be movably coupled to a primary structure of the aircraft, a second aerodynamic component which is movably coupled to the first aerodynamic component and a first panel element coupled to the first aerodynamic component. The first panel element at least partially covers a gap between the first aerodynamic component and the second aerodynamic component. The aerodynamic system further includes a sealing element arranged between the first aerodynamic component and the second aerodynamic component. The sealing element is configured to at least partially block an airflow between the first aerodynamic component and the second aerodynamic component.

15 Claims, 1 Drawing Sheet

(51) Int. Cl.
  *B64C 9/10* (2006.01)
  *B64C 9/16* (2006.01)

(56) References Cited

U.S. PATENT DOCUMENTS

| | | | | |
|---|---|---|---|---|
| 4,717,097 A | * | 1/1988 | Sepstrup | B64C 3/50 |
| | | | | 244/90 R |
| 5,622,336 A | * | 4/1997 | Chavanne | B64C 7/00 |
| | | | | 244/129.1 |
| 6,076,775 A | | 6/2000 | Bauer | |
| 6,220,551 B1 | * | 4/2001 | Saiz | B64C 9/30 |
| | | | | 244/89 |
| 6,257,528 B1 | * | 7/2001 | Brislawn | B63H 25/381 |
| | | | | 244/211 |
| 7,669,800 B2 | * | 3/2010 | Martin | B64C 7/00 |
| | | | | 244/130 |
| 7,815,147 B2 | * | 10/2010 | Martin | B64C 7/00 |
| | | | | 244/130 |
| 7,891,610 B2 | * | 2/2011 | Arnaud | B64C 9/18 |
| | | | | 244/17.11 |
| 7,992,825 B2 | * | 8/2011 | Llamas | B64C 9/10 |
| | | | | 244/211 |
| 8,336,829 B2 | * | 12/2012 | Reckzeh | B64C 9/14 |
| | | | | 244/215 |
| 8,556,214 B2 | * | 10/2013 | McAlinden | B64C 9/14 |
| | | | | 244/130 |
| 9,038,964 B2 | * | 5/2015 | Wildman | B64C 9/20 |
| | | | | 244/215 |
| 9,452,819 B2 | * | 9/2016 | Zeon | B64C 7/00 |
| 11,046,421 B2 | * | 6/2021 | Decker | B64C 7/00 |
| 11,673,645 B2 | * | 6/2023 | Kobierecki | B64C 3/185 |
| | | | | 244/123.8 |
| 2012/0012696 A1 | | 1/2012 | Sakurai et al. | |

FOREIGN PATENT DOCUMENTS

| | | |
|---|---|---|
| FR | 2351005 A1 | 12/1977 |
| WO | 2017007304 A1 | 1/2017 |

* cited by examiner

AERODYNAMIC SYSTEM FOR AN AIRCRAFT

CROSS-REFERENCES TO RELATED APPLICATIONS

This application claims the benefit of the European patent application No. 23167356.7 filed on Apr. 11, 2023, the entire disclosures of which are incorporated herein by way of reference.

FIELD OF THE INVENTION

The invention generally relates to movable aerodynamic structures. In particular, the invention relates to an aerodynamic system for an aircraft and an aircraft comprising such an aerodynamic system.

BACKGROUND OF THE INVENTION

Movables like flap components for aircraft are usually exposed to strong aerodynamic loads during operation of the aircraft. For example, flap components are attached at a trailing edge region of an aircraft wing and provide specified cruise and high-lift configurations, wherein the flap components are adapted to be retracted and deployed depending on the current flight condition. Furthermore, so-called tabs may be attached to the flap components, wherein the tabs are rotatably attached to the flaps and rotate about a hinge line. An important design parameter is the gap between the flap and the tab, since this gap considerably affects the airflow in the trailing edge region.

US 2012/0012696 A1 describes an aircraft flap actuator assembly which includes at least one fixed support, at least one track having a curvilinear track surface connected to the fixed support, at least one flap support adapted to traverse the curvilinear track surface, a trailing edge flap connected to the at least one flap support and a flap actuator engaging the at least one flap support.

U.S. Pat. No. 6,076,775 A describes a lifting airfoil such as an aircraft wing with a landing flap that forms at least a portion of a trailing edge of the airfoil and that is movably connected to the main body of the airfoil, wherein the landing flap has a flap leading edge nose and a flap trailing edge body and is bounded by a pressure-side cover skin and a vacuum-side cover skin.

SUMMARY OF THE INVENTION

It may be seen as an object of the invention to improve the aerodynamic characteristics of an aerodynamic system.

According to an aspect of the invention, an aerodynamic system for an aircraft is provided. The aerodynamic system comprises a first aerodynamic component configured to be movably coupled to a primary structure of the aircraft and a second aerodynamic component which is movably coupled to the first aerodynamic component. The aerodynamic system further comprises a first panel element coupled to the first aerodynamic component, wherein the first panel element at least partially covers a gap between the first aerodynamic component and the second aerodynamic component. The aerodynamic system further comprises a sealing element arranged between the first aerodynamic component and the second aerodynamic component, wherein the sealing element is configured to at least partially block an airflow between the first aerodynamic component and the second aerodynamic component.

The inventive aerodynamic system provides a configuration that improves the sealing between two aerodynamic components which are movably coupled to each other. In particular, an improved sealing of the gap between two airfoil-like components can be provided by the sealing element arranged between these components. In addition to the sealing improvement, a continuous outer contour of the aerodynamic system can be provided by the first panel element which may span at least a part and preferably most of the gap between the two aerodynamic components in their surface regions. In other words, the first panel element can additionally provide a stiff element between the two aerodynamic components along which the air flow can be guided. In some configurations, the first panel element completely spans the gap and is pressed against the outer surface of the second aerodynamic component.

The aerodynamic system may further comprise a wing structure which may be seen as a base system to which the first aerodynamic component is movably coupled. Accordingly, the second aerodynamic component may be coupled to the wing structure via the first aerodynamic component. The first aerodynamic component may have an upper and a lower surface which may be connected to each other via a leading edge section at the front of first aerodynamic component and via a trailing edge section at the rear of the first aerodynamic component. Analogously, the second aerodynamic component may also have an upper and a lower surface which may be connected to each other via a leading edge section at the front of second aerodynamic component and via a trailing edge section at the rear of the second aerodynamic component.

The first aerodynamic component may be a trailing edge movable of an aircraft. In particular, the first aerodynamic component may be a flap component, e.g., a flap or part of a flap, and may be arranged at the rear of a wing structure of said aircraft. The second aerodynamic component may also be a trailing edge movable of the aircraft. In particular, the second aerodynamic component may be a tab component, e.g., a tab or part of a tab, and may be arranged at the rear, i.e., at a trailing edge section, of the first aerodynamic component. Multiple of such trailing edge movables may together form a trailing edge unit. For example, multiple trailing edge movables are arranged next to each other along a spanwise extension direction of the wing structure. However, multiple trailing edge movables may also be arranged next to each other along a chordwise extension direction of the wing structure, wherein the trailing edge movables provide a series of trailing edge movables coupled to each other.

It is noted that the first aerodynamic component may also be a vertical stabilizer of an aircraft, in which case the second aerodynamic component may be a rudder of the aircraft. It is also possible that the first aerodynamic component may be a horizontal stabilizer of an aircraft, in which case the second aerodynamic component may be an elevator of the aircraft.

The first aerodynamic component is movably couplable to the wing structure of the aircraft, wherein the first aerodynamic component can be moved between a retracted and a deployed configuration. The movement between the retracted and the deployed configuration of the first aerodynamic component relative to the wing structure may encompass a translational movement, a rotational movement or a combined translational and rotational movement. The second aerodynamic component may be configured to rotate about the trailing edge section of the first aerodynamic component, in particular about a hinge axis positioned at the first aerodynamic component. The second aerodynamic component may be rotated with respect to the first aerodynamic component between a positive deflection configuration and a negative deflection configuration.

The first panel element may have the function to span the gap between the first and the second aerodynamic component and, thus, to streamline or guide the airflow in the transition region between the first aerodynamic component and the second aerodynamic component, i.e., along the upper or lower surfaces of the two aerodynamic components. The first panel element may be attached to a skin section of the first aerodynamic component and may extend in a downstream direction of the first aerodynamic component to span or cover at least a part of the gap between the first aerodynamic component and the second first aerodynamic component. For example, the first panel element can be attached to an upper surface of the skin section of the first aerodynamic component.

The sealing element may be a flexible sealing element that can be arranged between the first aerodynamic component and the second aerodynamic component. In particular, the sealing element may be pressed between the first aerodynamic component and the second aerodynamic component. It may be attached to one or both of the first and second aerodynamic components, for example using mechanical fastening elements, adhesives, etc. The sealing element may block the airflow coming from a lower side of the first and second aerodynamic components as will be described in more detail below.

According to an embodiment, the sealing element is spatially separated from the first panel element.

The first panel element may be attached in the vicinity of an upper surface of the first aerodynamic component and may extend downstream to an upper surface of the second aerodynamic component. In contrast, the sealing element may be arranged between the upper and lower surfaces of the first and second aerodynamic components, i.e., adjacent to a central axis or chord line of the first aerodynamic component and the second aerodynamic component. This will be described in more detail with respect to the Figures below. For example, the sealing element may block an airflow before it arrives at the first panel element.

According to an embodiment, the sealing element is arranged between a nose section of the second aerodynamic component and a trailing edge section of the first aerodynamic component.

The first aerodynamic component may comprise an airfoil-like cross-section having a truncated trailing edge section. The second aerodynamic component may comprise an airfoil-like cross-section having a rounded nose section. The sealing element may be arranged, e.g., pressed, between the truncated trailing edge section of the first aerodynamic component and the rounded nose section of the second aerodynamic component.

According to an embodiment, the second aerodynamic component comprises a recess at the nose section of the second aerodynamic component, wherein the aerodynamic system further comprises a nose support element which is received within the recess at the nose section of the second aerodynamic component, and wherein the sealing element is arranged between the nose support element of the second aerodynamic component and the trailing edge section of the first aerodynamic component.

The nose support element may be a three-dimensionally (3D) printed piece that may be attached to the nose section of the second aerodynamic component. However, it should be understood that, in an alternative example, the nose support element may be integrally manufactured with the remaining structure of the second aerodynamic component. The nose support element may provide an adapted contour against which the sealing element can be pressed for the above-described sealing improvement. In particular, using such an additional nose support element provides a possibility to adapt the nose contour to the specific needs or shape of the sealing element that is to be pressed against the nose section of the second aerodynamic component.

According to an embodiment, the trailing edge section of the first aerodynamic component comprises a trailing edge support unit, wherein the trailing edge support unit is configured to support a portion of the first panel element.

The trailing edge support unit may be an additional structural piece that is attached to the trailing edge section of the first aerodynamic component. The first panel element may be attached to an upper surface of the first aerodynamic component, in particular at the trailing edge section of the first aerodynamic component. In addition, the first panel element may be attached to or may be at least supported by the trailing edge support unit. That is, a portion of the first panel element may be attached to the first aerodynamic component at the upper surface, another portion of the first panel element may be supported by the trailing edge support unit, and yet another portion of the first panel element may comprise a free end extending over the gap between the upper surface of the first aerodynamic component and the upper surface of the second aerodynamic component. Using an additional trailing edge support unit provides a possibility to adapt the trailing edge contour to the specific needs or shape of the sealing element that is to be pressed against the trailing edge section of the first aerodynamic component.

According to an embodiment, the sealing element is arranged, e.g., pressed, between the nose section of the second aerodynamic component and the trailing edge support unit of the first aerodynamic component.

For example, the sealing element may be arranged, e.g., pressed, between the nose section of the second aerodynamic component and the trailing edge support unit of the first aerodynamic component during a rotational movement of the second aerodynamic component relative to the first aerodynamic component.

According to an embodiment, the second aerodynamic component is pivotably coupled to the first aerodynamic component, thereby enabling a pivotal movement of the second aerodynamic component with respect to the first aerodynamic component, wherein the sealing element is in contact with the trailing edge section of the first aerodynamic component and the nose section of the second aerodynamic component during the pivotal movement, for example during the entire pivotal movement, of the second aerodynamic component with respect to the first aerodynamic component.

In particular, the sealing element may simultaneously contact the nose section and the trailing edge section during a rotation of the second aerodynamic component relative to the first aerodynamic component between the above-mentioned positive deflection configuration and the negative deflection configuration. In this manner, the airflow between the first and the second aerodynamic component can be at least partially blocked during the operation of the aerodynamic system. It is possible that the sealing element may simultaneously contact the nose section and the trailing edge section during the rotation of the second aerodynamic component relative to the first aerodynamic component between a most positive deflection configuration and a most negative deflection configuration.

According to an embodiment, the sealing element is configured to be pressed against the trailing edge section of the first aerodynamic component by blocking the airflow between the first aerodynamic component and the second aerodynamic component.

Additionally or alternatively, the sealing element is configured to be pressed against the nose section of the first aerodynamic component by blocking the airflow between the first aerodynamic component and the second aerodynamic component.

For example, the sealing element may be designed or shaped such that an air pressure difference may cause parts of the sealing element to be urged against the nose section and the trailing edge section. In particular, an air pressure at a lower side of the first and second aerodynamic components may be greater than an air pressure at an upper side of the first and second aerodynamic components such the air will tend to flow from the lower side to the upper side. Due to the blocking of the airflow by the sealing element, the sealing element may be deformed, thereby pressing parts of the sealing elements more strongly against the nose section and the trailing edge section.

According to an embodiment, the sealing element is a D-type sealing element or a blade-type sealing element, in particular, a double blade sealing element.

These shapes may define cross-sectional shapes of the sealing element. It is understood that other sealing types may also be used.

According to an embodiment, the first aerodynamic component has an aerodynamic outer surface and the second aerodynamic component has an aerodynamic outer surface, wherein the first panel element at least partially covers a gap, for example the gap described above, between the aerodynamic outer surface of the first aerodynamic component and the aerodynamic outer surface of the second aerodynamic component.

The first flexible panel element may comprise a predetermined flexibility and/or pre-tension after manufacturing the same. It may comprise a fiber-reinforced material, for example a fiber-reinforced plastic material like carbon fiber-reinforced plastics (CFRP) or glass fiber reinforced plastics (GFRP). However, it may also comprise a metallic material or combinations of fiber-reinforced materials and metallic materials. The first flexible panel element may be manufactured using a molding process in which it is pre-formed or pre-shaped. The first flexible panel element may have a sheet-like or plate-like shape. It may span a part of the gap between the aerodynamic outer surfaces of the first and second aerodynamic components.

According to an embodiment, the first panel element has a flexible portion that is configured to establish a contact with the aerodynamic outer surface of the second aerodynamic component.

The flexible portion may define a free end of the first panel element that is not supported by the trailing edge support unit or by any structural part of the first aerodynamic component. It is possible that the contact between the flexible portion and the outer surface, e.g., the upper surface, of the second aerodynamic component is only established in specified configurations, i.e., in a certain deflection configuration, of the second aerodynamic component with respect to the first aerodynamic component. In other configurations, there may be a distance between the flexible portion and the outer surface of the second aerodynamic component. Upon establishing the contact between the first panel element and the aerodynamic outer surface of the second aerodynamic component, it is possible that the first panel element will slightly be bent. However, there are several configurations in which there is no pretension on the first panel element.

According to an embodiment, the aerodynamic system further comprises a second panel element coupled to the first aerodynamic component, wherein the second panel element at least partially covers a gap, for example the gap described above, between the first aerodynamic component and the second aerodynamic component.

In other words, the second panel element may span the above-described gap in the vicinity of the lower side of the first and second aerodynamic components, whereas the first panel element may span the above-described gap in the vicinity of the upper side of the first and second aerodynamic components. The first and second panel elements may represent reinforcement support elements at the upper and lower side of the aerodynamic system. The sealing element may be arranged between the first panel element and the second panel element. The second panel element may have the same characteristics and functions as the first panel element.

According to an embodiment, the sealing element is spatially separated from the second panel element, wherein the sealing element is arranged between the first panel element and the second panel element.

The sealing element may be arranged substantially midway between the first panel element and the second panel element.

According to an embodiment, the aerodynamic system is a trailing edge system, wherein the first aerodynamic component is a first trailing edge movable and wherein the second aerodynamic component is a second trailing edge movable.

In particular, the first aerodynamic component may be a flap couplable to a wing structure and the second aerodynamic component may be a tab coupled to the flap.

According to an aspect, an aircraft is provided. The aircraft comprises a wing structure and the aerodynamic system as described herein. The second aerodynamic component is movably coupled to the wing structure via the first aerodynamic component. For example, the aircraft is a transport aircraft or a passenger aircraft.

BRIEF DESCRIPTION OF THE DRAWINGS

The present invention will hereinafter be described in conjunction with the following drawing figures, wherein like numerals denote like elements, and wherein.

DETAILED DESCRIPTION OF THE PREFERRED EMBODIMENTS

Figure 1:
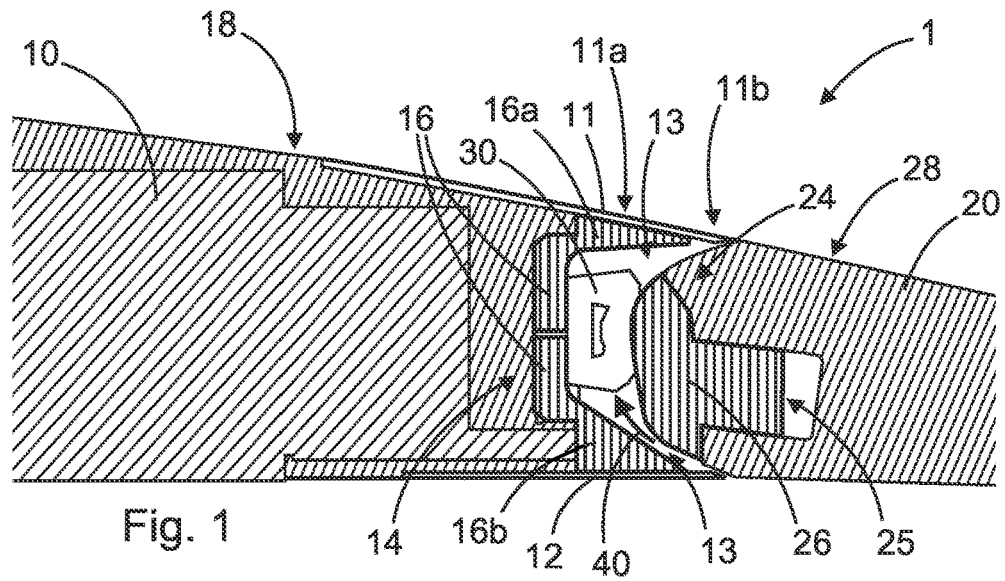
FIG. 1 shows an aerodynamic system comprising an exemplary sealing element arranged between a first aerodynamic component and a second aerodynamic component.

The representations and illustrations in the drawings are schematic and not to scale. A better understanding of the system described above may be obtained through a review of the illustrations accompanying this application together with a review of the detailed description that follows.

FIG. 1 shows an aerodynamic system 1, in particular a cross-sectional view of components of the aerodynamic system 1. The aerodynamic system 1 comprises a first aerodynamic component 10 which is configured to be movably coupled to a primary structure, such as a wing structure 111 shown in FIG. 3. The aerodynamic system 1 further comprises a second aerodynamic component 20 which is movably coupled to the first aerodynamic component 10. For example, the second aerodynamic component 20 may be pivotably coupled to the first aerodynamic component 10 via a coupling mechanism (such as those well known in the art). The first aerodynamic component 10 may be a flap component movably coupled to a trailing edge of an aircraft wing and the second aerodynamic component 20 may be a tab component that is rotatably coupled to the flap component.

The aerodynamic system 1 further comprises a first panel element 11, e.g., an upper panel element 11, coupled to the first aerodynamic component 10, wherein the first panel element 11 at least partially covers a gap 13 between the first aerodynamic component 10 and the second aerodynamic component 20. In particular, the first aerodynamic component 10 has an aerodynamic outer surface 18, i.e., an upper surface, and the second aerodynamic component 20 has an aerodynamic outer surface 28, i.e., an upper surface, wherein the first panel element 11 at least partially spans and thus covers the gap 13 between the aerodynamic outer surface 18 of the first aerodynamic component 10 and the aerodynamic outer surface 28 of the second aerodynamic component 20. This provides a continuous upper contour of the aerodynamic system 1. As can be seen in FIG. 1, the first panel element 11 has a supported portion 11a and a flexible portion 11b, e.g., in the form of a free end, that is configured to establish a contact with the aerodynamic outer surface 28 of the second aerodynamic component 20.

The aerodynamic system 1 further comprises a second panel element 12, e.g., a lower panel element 12, coupled to the first aerodynamic component 10, wherein the second panel element 12 at least partially covers the gap 13 between the first aerodynamic component 10 and the second aerodynamic component 20, at a lower side of the aerodynamic system 1. The second panel element 12 may be arranged with respect to the described components in the same way as the first panel element 11, with the exception that the second panel element 12 is arranged at the lower side of the first and second aerodynamic components 10, 20. In particular, the first aerodynamic component 10 has a lower surface and the second aerodynamic component 20 has a lower surface, wherein the second panel element 12 at least partially spans and thus covers the gap 13 between the lower surface of the first aerodynamic component 10 and the lower surface of the second aerodynamic component 20. This provides a continuous lower contour of the aerodynamic system 1. As can be seen in FIG. 1, the second panel element 12 also has a supported portion and a flexible portion, e.g., in the form of a free end, that is configured to establish a contact with the lower surface of the second aerodynamic component 20.

The aerodynamic system 1 further comprises a sealing element 30 arranged between the first aerodynamic component 10 and the second aerodynamic component 20. The sealing element 30 is configured to at least partially block an airflow 40 between the first aerodynamic component 10 and the second aerodynamic component 20. The airflow 40 may represent an airflow condition during the operation of the aerodynamic system 1, wherein the arrow in FIG. 1 shows the flow direction of the airflow 40 through the gap 13. The gap 13 may extend from a lower side of the first and second aerodynamic components 10, 20 to an upper side of the first and second aerodynamic components 10, 20. For example, a pressure at the lower side of the first and second aerodynamic components 10, 20 may be greater than a pressure at the upper side of the first and second aerodynamic components 10, 20 such that the airflow 40 through the gap 13 as shown in FIG. 1 will occur. The sealing element is adapted to block this airflow 40 at least partially. The sealing element 30 is spatially separated from the first panel element 11 and is also spatially separated from the second panel element 12. As can be seen, the sealing element 30 is arranged substantially midway between the first panel element 11 and the second panel element 12. In particular, a part of the gap 13 may be located between the first panel element 11 and the sealing element 30 and another part of the gap 13 may be located between the second panel element 12 and the sealing element 30. The sealing element 30 may extend in a spanwise direction of the aerodynamic system 1. That is, the sealing element 30 may extend in the spanwise direction between the first aerodynamic component 10 and the second aerodynamic component 20. In the spanwise direction of the aerodynamic system 1, the sealing element 30 may be interrupted at specified positions due to the presence of the coupling mechanism that couples the second aerodynamic component 20 to the first aerodynamic component 10.

As can further be seen from FIG. 1, the sealing element 30 is arranged between a nose section 24 of the second aerodynamic component 20 and a trailing edge section 14 of the first aerodynamic component 10. In particular, the second aerodynamic component 20 comprises a recess 25 or opening 25 at the nose section 24 of the second aerodynamic component 20 in which an insert, e.g., a nose support element 26, is accommodated. The nose support element 26 may be a 3D printed part that has a specified outer contour. In this manner, the nose contour of the second aerodynamic component 20 may be adapted to the specific requirements, for example to the type of sealing element 30 used to seal the gap 13.

The trailing edge section 14 of the first aerodynamic component 10 may comprise a trailing edge support unit 16, wherein the trailing edge support unit 16 is configured to support a portion 11a of the first panel element 11. In the example shown in FIG. 1, the trailing edge support unit 16 is also configured to support a portion of the second panel element 12. The trailing edge support unit 16 may be split into two pieces or parts which together define the trailing edge support unit 16. As can be seen from FIG. 1, the trailing edge support unit 16 has an upper trailing edge support part 16a which is attached at an upper part of the truncated trailing edge of the first aerodynamic component 10 as well as a lower trailing edge support part 16b which is attached at a lower part of the truncated trailing edge of the first aerodynamic component 10. The upper trailing edge support part 16 provides a support for the supported portion 11a of the first panel element 11 and the lower trailing edge support part 16b provides a support for a supported portion of the second panel element 12. This additional internal support makes the use of a semi-finished plate material for the panel elements 11, 12 feasible. The sealing element 30 can be simultaneously pressed against the upper trailing edge support part 16a and the lower trailing edge support part 16b as shown in FIG. 1. It is noted that the upper and lower trailing edge support parts 16a, 16b may not necessarily be separate components, but may also be connected to each other or integrally formed with the first aerodynamic component 10.

In the example of FIG. 1, the sealing element 30 is a D-type sealing element, e.g., a D-type flex sealing element. The sealing element 30 is arranged in the gap 13 between the two aerodynamic components 10, 20 and blocks most or all of the air flowing from the lower side of the aerodynamic system 1 to the upper side of the aerodynamic system 1.

Figure 2:
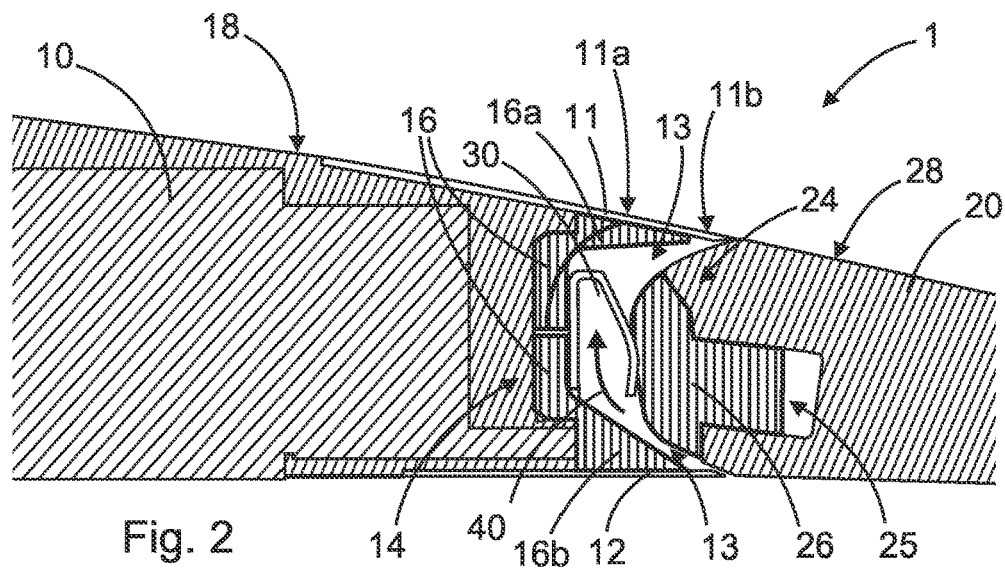
FIG. 2 shows an aerodynamic system comprising another exemplary sealing element arranged between a first aerodynamic component and a second aerodynamic component.

FIG. 2 shows an aerodynamic system, for example the aerodynamic system 1 of FIG. 1, wherein all components as described above in FIG. 1 are present also in FIG. 2. Only the sealing element 30 has another shape than the sealing element 30 in FIG. 1. In particular, the D-type sealing element in FIG. 1 is replaced by a blade sealing element in FIG. 2. The blade sealing element comprising another (alternative) exemplary sealing element 30 arranged between the first aerodynamic component 10 and the second aerodynamic component 20. The blade sealing element may be substantially U-shaped in its cross-section, wherein the airflow 40 may generate a high pressure inside the blade seal 30 which causes the side walls of the U-shaped blade seal to urge outwardly and press against the trailing edge section 14 of the first aerodynamic component 10 and the nose section 24 of the second aerodynamic component 20. In other words, a pressure difference in the gap 13 between the lower side of the sealing element 30 and the upper side of the sealing element 30 may be used to provide an additional force with which the sealing element 30 is pressed against the trailing edge section 14 of the first aerodynamic component 10 as well as the nose section 24 of the second aerodynamic component 20. This further improves the sealing effect by the sealing element 30 and thus the blocking of the airflow 40 inside the gap 13.

As can be derived from the above explanations, the inventive design of the aerodynamic system 1 may almost or completely close the gap 13 between the two aerodynamic components 10, 20, thereby maintaining an excellent aerodynamic surface. It also provides flexibility for a small upward movement of the second aerodynamic component 20 relative to the first aerodynamic component 10 if a contact between the first panel element 11 and the upper surface of the second aerodynamic component 20 occurs. The same applies to the second panel element 12 during a downward movement of the second aerodynamic component 20.

Furthermore, the airflow 40 is efficiently blocked by the sealing element 30 at a centerline between the two aerodynamic components 10, 20. The corresponding sealing arrangement is further improved by the adapted design of the trailing edge section 14 at the first aerodynamic component 10 and the nose section 24 at the second aerodynamic component 20, such that sufficient compression can be provided for the sealing element 30.

Figure 3:
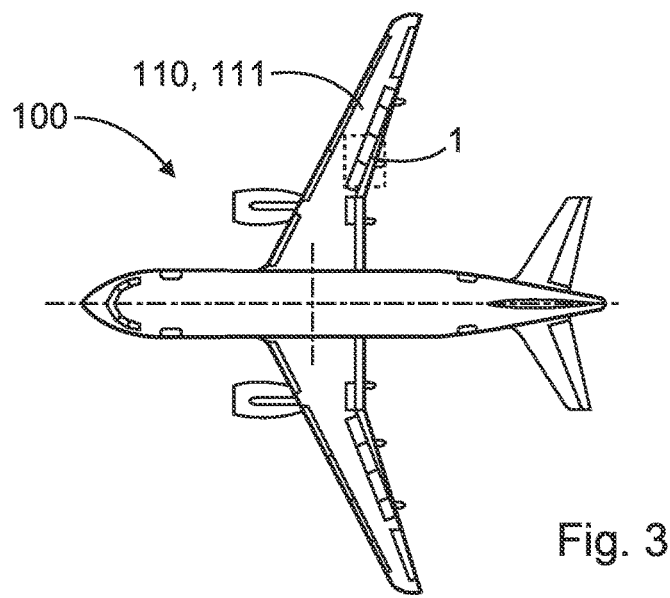
FIG. 3 shows an aircraft comprising an aerodynamic system.

FIG. 3 shows an aircraft 100 comprising an aerodynamic system, for example the aerodynamic system 1 as described with respect to FIGS. 1 and 2 above. The aircraft 100 comprises a wing 110 having a wing structure 111, wherein the aerodynamic system 1 may be coupled to the wing structure 111. In particular, the second aerodynamic component 20 is movably coupled to the wing structure 111 via the first aerodynamic component 10. The wing structure 111 may be a support structure of the wing 110 to which the first aerodynamic component 10 is movably coupled via a coupling mechanism.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aerodynamic system for an aircraft, comprising:
a first aerodynamic component configured to be movably coupled to a primary structure of the aircraft;
a second aerodynamic component which is movably coupled to the first aerodynamic component;
a first panel element coupled to the first aerodynamic component, wherein the first panel element at least partially covers a gap between the first aerodynamic component and the second aerodynamic component;
a sealing element arranged between the first aerodynamic component and the second aerodynamic component, wherein the sealing element is configured to at least partially block an airflow between the first aerodynamic component and the second aerodynamic component,
wherein the sealing element is arranged between a nose section of the second aerodynamic component and a trailing edge section of the first aerodynamic component;
wherein the second aerodynamic component comprises a recess at the nose section of the second aerodynamic component;
wherein the aerodynamic system further comprises a nose support element which is received within the recess at the nose section of the second aerodynamic component; and
wherein the sealing element is arranged between the nose support element of the second aerodynamic component and the trailing edge section of the first aerodynamic component.

2. The aerodynamic system of claim 1, wherein the sealing element is spatially separated from the first panel element.

3. The aerodynamic system according to claim 1, wherein the trailing edge section of the first aerodynamic component comprises a trailing edge support unit; and wherein the trailing edge support unit is configured to support a portion of the first panel element.

4. The aerodynamic system according to claim 3, wherein the sealing element is arranged between the nose section of the second aerodynamic component and the trailing edge support unit of the first aerodynamic component.

5. The aerodynamic system according to claim 1, wherein the second aerodynamic component is pivotably coupled to the first aerodynamic component, thereby enabling a pivotal movement of the second aerodynamic component with respect to the first aerodynamic component; and wherein the sealing element is in contact with the trailing edge section of the first aerodynamic component and the nose section of the second aerodynamic component during the pivotal movement of the second aerodynamic component with respect to the first aerodynamic component.

6. The aerodynamic system according to claim 1, wherein the sealing element is configured to be pressed against the trailing edge section of the first aerodynamic component thereby blocking the airflow between the first aerodynamic component and the second aerodynamic component.

7. The aerodynamic system according to claim 1, wherein the sealing element is configured to be pressed against the nose section of the second aerodynamic component thereby blocking the airflow between the first aerodynamic component and the second aerodynamic component.

8. The aerodynamic system according to claim 1, wherein the sealing element is a D-type sealing element.

9. The aerodynamic system according to claim 1, wherein the sealing element is a blade-type sealing element.

10. The aerodynamic system according to claim 1,
wherein the first aerodynamic component has an aerodynamic outer surface and the second aerodynamic component has an aerodynamic outer surface; and
wherein the first panel element at least partially covers a gap between the aerodynamic outer surface of the first aerodynamic component and the aerodynamic outer surface of the second aerodynamic component.

11. The aerodynamic system according to claim 10, wherein the first panel element has a flexible portion that is configured to establish a contact with the aerodynamic outer surface of the second aerodynamic component.

12. The aerodynamic system according to claim 1, further comprising:
a second panel element coupled to the first aerodynamic component,
wherein the second panel element at least partially covers a gap between the first aerodynamic component and the second aerodynamic component.

13. The aerodynamic system according to claim 12,
wherein the sealing element is spatially separated from the second panel element; and
wherein the sealing element is arranged between the first panel element and the second panel element.

14. The aerodynamic system according to claim 1,
wherein the aerodynamic system is a trailing edge system;
wherein the first aerodynamic component is a first trailing edge movable; and
wherein the second aerodynamic component is a second trailing edge movable.

15. An aircraft comprising:
a wing structure;
the aerodynamic system according to claim 1;
wherein the second aerodynamic component is movably coupled to the wing structure via the first aerodynamic component.

* * * * *